United States Patent
Bell, Jr. et al.

(10) Patent No.: US 6,396,783 B1
(45) Date of Patent: May 28, 2002

(54) MECHANISM FOR CONTROLLING SPACING BETWEEN OPTICAL HEAD AND STORAGE MEDIUM IN OPTICAL STORAGE SYSTEMS

(75) Inventors: Bernard W. Bell, Jr., Lafayette, CO (US); Vlad Novotny, Los Gatos, CA (US); Hossein Moghadam, San Jose, CA (US); Roger Hajjar, San Jose, CA (US); Yung-Chieh Hsieh, San Jose, CA (US); Brian Tremaine, San Jose, CA (US)

(73) Assignee: Terastor Corporation, San Jose, CA (US)

( * ) Notice: Subject to any disclaimer, the term of this patent is extended or adjusted under 35 U.S.C. 154(b) by 0 days.

(21) Appl. No.: 09/405,511

(22) Filed: Sep. 23, 1999

(51) Int. Cl.⁷ .................................. G11B 27/36
(52) U.S. Cl. .................. 369/53.18; 369/53.13; 369/13.33
(58) Field of Search ................. 369/126, 13.33, 369/264.4, 53.25, 300, 53.13, 53.28, 53.18; 360/97.01, 73.03, 71, 75, 69, 264.2, 245; 250/306

(56) References Cited

U.S. PATENT DOCUMENTS

| | | | | |
|---|---|---|---|---|
| 5,095,396 A | * | 3/1992 | Putnam et al. | 360/106 |
| 5,199,021 A | * | 3/1993 | Hatanaka et al. | 369/126 |
| 5,276,573 A | * | 1/1994 | Harada et al. | 360/103 |
| 5,418,363 A | * | 5/1995 | Elings et al. | 250/306 |
| 5,535,185 A | * | 7/1996 | Kishi et al. | 369/126 |
| 5,764,430 A | * | 6/1998 | Ottesen et al. | 360/73.03 |
| 6,069,853 A | * | 5/2000 | Novotny et al. | 369/13 |
| 6,125,008 A | * | 9/2000 | Berg et al. | 360/106 |

* cited by examiner

*Primary Examiner*—David Hudspeth
*Assistant Examiner*—Kim-Kwok Chu
(74) *Attorney, Agent, or Firm*—Fish & Richardson, P.C.

(57) ABSTRACT

An optical disk drive having a thermal control mechanism on the optical head to control the spacing between the optical head and the surface of the storage medium.

41 Claims, 9 Drawing Sheets

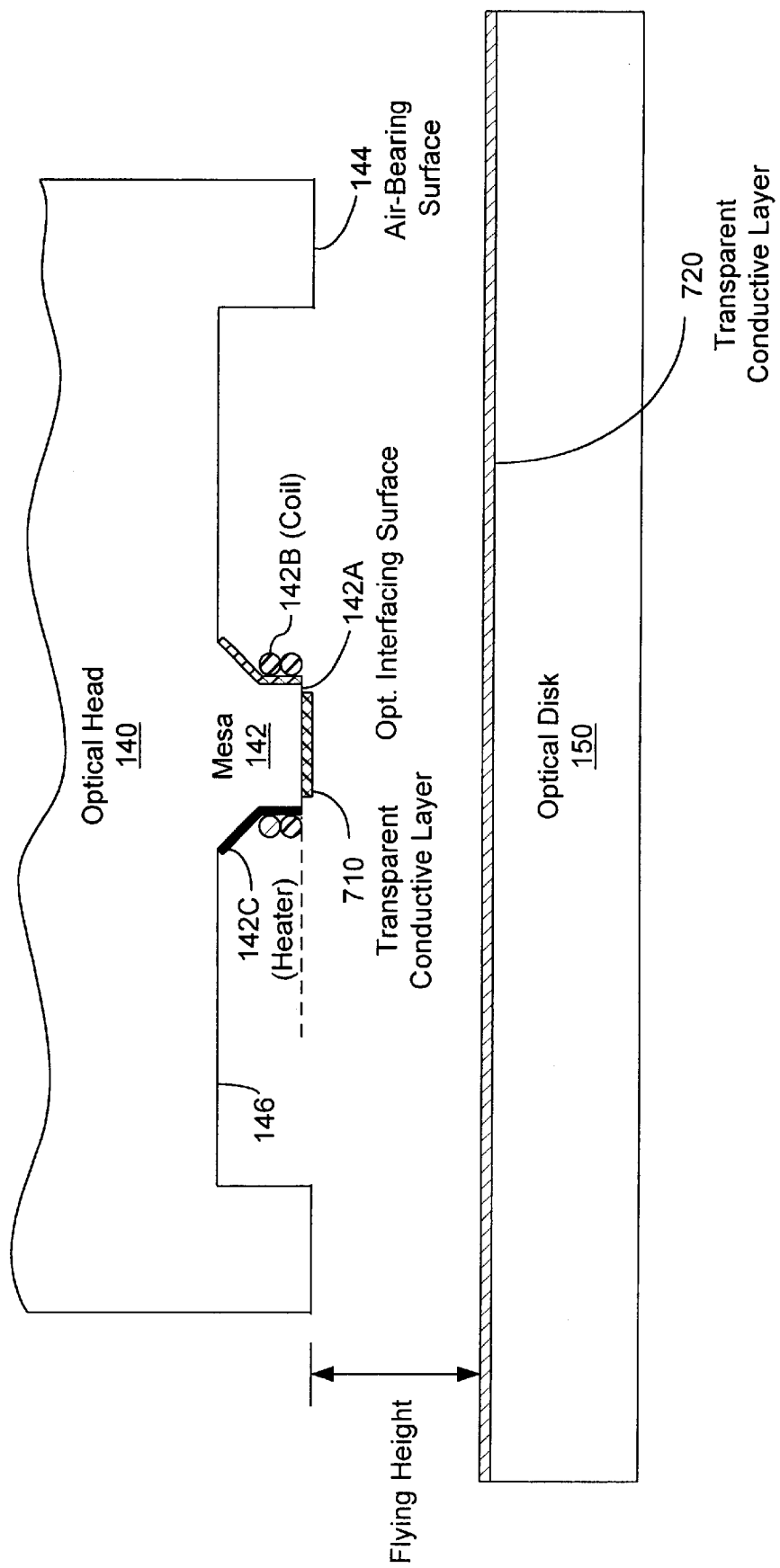

MECHANISM FOR CONTROLLING SPACING BETWEEN OPTICAL HEAD AND STORAGE MEDIUM IN OPTICAL STORAGE SYSTEMS

BACKGROUND

The present disclosure generally relates to data storage, and more particularly, to an optical head that couples radiation energy or other signals.

A typical optical storage system uses an optical head to focus a monochromatic optical beam to a small spot on a recording layer for reading and writing. The optical head has an optical interfacing surface that couples optical radiation to and from the storage medium. The interfacing surface may be an optical surface of a lens, an optical flat, or a transparent mesa formed as part of a lens in the optical head. The spacing between the interfacing surface and the storage medium is a critical device parameter that can determine the storage capacity and affect the operation of a storage system.

The spacing may be greater than one wavelength so that the optical energy is coupled between the optical head and the medium by light propagation. An optical head in such a configuration is in a "far-field" optical configuration. The numerical aperture of the head in a far-field configuration is less than unity. The minimum beam spot size projected on the medium by the head is limited by the diffraction of light to a limit on the order of one half wavelength. Accordingly, the areal density of such an optical storage device is limited by this minimum diffraction-limited spot size.

The areal density in optical storage can be increased beyond the diffraction limit by using an optical storage device in a "near-field" configuration where the interfacing surface of the optical head is spaced from the medium by a distance on the order of or less than one wavelength. The optical energy can be coupled between the optical head and the medium by evanescent coupling, with or without ordinary light propagation. The numerical aperture of the optical head in such a near-field configuration can be greater than unity. This is not possible in a far-field configuration. Hence, a near-field optical storage system can produce a focused beam spot size less than one half wavelength to achieve a high areal storage density beyond the capability of many far-field systems.

The spacing between the optical head and the storage medium in a near-field configuration can be maintained by an air bearing. In a near-field optical disk drive, the spinning motion of the disk relative to the optical head can generate a lifting force on an air-bearing surface formed in the optical head. This force can be sufficient to "suspend" the head over the surface of the disk at a desired distance less than one wavelength, e.g., in a range from about 10 nm to about 200 nm in some implementations.

The spacing should be maintained at a desired constant spacing within a predetermined tolerance range in order to achieve a repeatable and optimal performance. Any variation or defect in the geometry and surface quality of the air-bearing surface of the head can affect this spacing. Hence, the tolerances of the geometry and surface quality of the air-bearing surface of the head are usually strenuous and often cause a low yield in manufacturing the head.

SUMMARY

The present disclosure provides a mechanism in an optical head that allows a controlled adjustment of the spacing between the interfacing surface and the storage medium. This adjustment can be used to optimize the performance of the head by maintaining the spacing at a desired value. In addition, the spacing between the interfacing surface and the medium may be different from the distance between the air bearing surface and the medium. It may be desirable to adjust these two distances separately. The adjustment can also compensate for variations or defects in the geometry and surface quality of the interfacing surface to allow use of a head that would otherwise be unusable. This effectively improves the yield in fabrication of the head.

One embodiment of an optical disk drive includes an optical head, a detection unit, an electrical heater, and a control circuit. The optical head includes an optically transparent interfacing surface to couple optical signals. The detection unit is configured to receive and detect a spacing-indicating signal from the optical head that indicates a spacing between the interfacing surface and the disk. The heater is disposed in the optical head to receive an electric current to supply heat so as to thermally shift the interfacing surface relative to the disk. The control circuit receives spacing information from the detection unit and controls the electric current to maintain the spacing at a desired value.

The optical head may include a transparent mesa structure having a mesa surface to effect the interfacing surface. The spacing-indicating signal may include a reflected optical signal from the optical head that has a dependence on said spacing so that the actual spacing can be determined. The spacing dependence of the reflected optical signal may be calibrated with reference to a contact point between the disk and the head, e.g., by using an optical distortion caused by mass transfer from the disk to the interfacing surface or an acoustic wave generated when the head comes into contact with the disk.

A method for operating an optical disk drive to maintain a desired head-disk spacing is also provided to maintain the spacing between the optical head and the disk. Heat is supplied to the optical head to control a position of the interfacing surface by thermal expansion. According to one embodiment, the spacing control includes: (1) detecting a reflected optical signal from the optical head to determine the actual spacing between the interfacing surface and the disk, (2) determining a difference between the actual spacing and a desired spacing; and (3) adjusting an amount of heat to the optical head to reduce the difference.

These and other aspects and associated advantages will become more apparent in light of the following detailed description, the accompanying drawings, and the appended claims.

BRIEF DESCRIPTION OF THE DRAWINGS

FIG. 7 shows two conductive layers respectively formed on the mesa of the optical head and the disk for contact detection based on measurements of a leakage current and spacing detection based on capacitance measurements.

DETAILED DESCRIPTION

Figure 1:
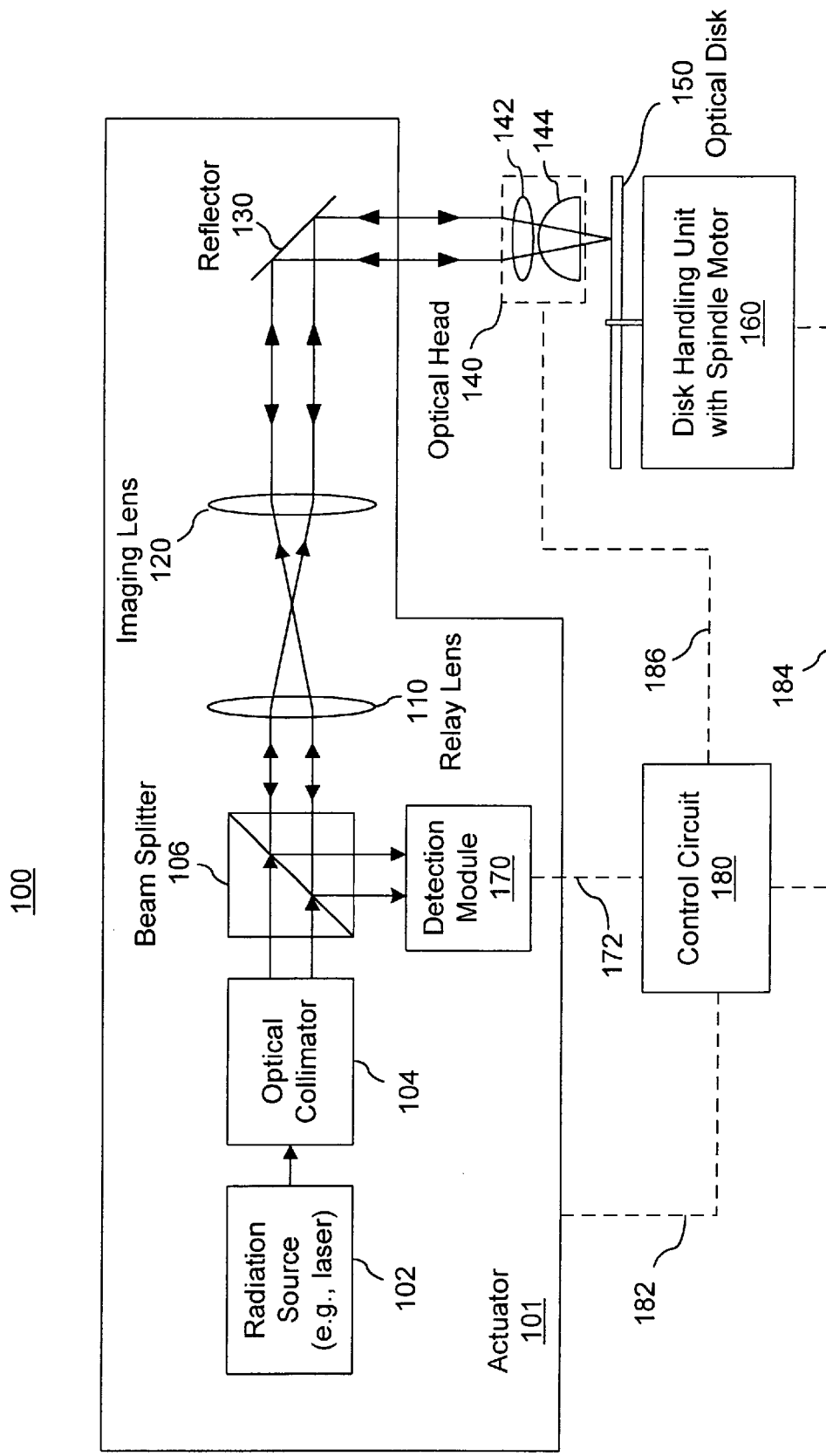
FIG. 1 shows one embodiment of an optical disk drive.

FIG. 1 is block diagram showing some basic features of an optical disk drive 100 in accordance with one embodiment. A radiation source 102, such as a laser, produces a beam at a specified wavelength for recording and retrieving data. An optical disk 150 includes at least one storage layer for data storage. The storage layer is formed of a suitable material such as a magneto-optical material or phase-change material. Data is spatially distributed and stored in the storage layer by a suitable encoding method. An optical beam from the radiation source 102 is collimated by an optical collimator 104 and then projected to an optical head 140 by a relay lens 110 and an imaging lens 120.

A disk handling unit 160 holds the optical disk 150 relative to the optical head 140 at a desired distance to allow proper optical coupling between the optical head 140 and the disk 150. The optical disk 150 may be a removable medium or a fixed medium. The disk handling unit 160 includes a spindle and a clamping mechanism for holding the disk 150 and a spindle motor that rotates the disk 150 around the spindle at a desired speed (e.g., around 2000 rpm or higher).

The optical head 140 is configured to focus the beam to a desired recording layer in the disk 150. The optical head 140 also couples the reflected beam from the disk 150 to a detection module 170 that includes at least one data detector to extract data signals from the reflected beam. The detection module 170 may further include a tracking detector to produce a tracking error signal indicating the relative position of the beam from a desired track on the disk. A beam splitter 106 may be disposed to guide the reflected beam from the disk 150 to the detection module 170. The output beam from the radiation source 102 may be polarized and the beam splitter 106 may be a polarizing prism in order to transmit a portion of the output beam while directing a portion of the reflected beam to the detection module 170. A polarization rotator, e.g., a quarter wave plate, may be placed between the beam splitter 106 and the disk 150.

An actuator 101 of either a linear type or a rotary type is implemented to position the optical head 140 over a desired position of the disk 150. The optical head 140 may be attached to the actuator 101 by a flexible suspension arm so that the optical head 140 is supported over the disk 150 at a desired spacing by an air bearing. This maintains a near-field configuration. All other optical elements, including the light source 102, the detection module 170 and beam guiding elements, are attached to the actuator 101 and have a predetermined spatial relation with one another to maintain such a relation. In particular, the predetermined spatial relation may be maintained without a servo control. Alternatively, a servo control, e.g., a focusing servo control may be used to control the position of at least one lens in the optical train to maintain the predetermined spatial relation.

In yet another alternative, these optical elements may be attached to a baseplate of the disk drive so that they will not move with the actuator 101, with or without a servo control. A reflector 130 may be fixed to the actuator 101 or the optical head 140 so that the beam impinging upon the disk 150 is substantially perpendicular to the disk surface.

A control unit 180 generates a control signal 182 to control the operation of the actuator 101. The unit 180 receives one or more signals 172 from the detection module 170 which provide information on the optical head 140. The control unit 180 also controls the operation of the disk handling unit 160 via a link 184. For example, the spinning speed of the disk 150 can be controlled by controlling the spindle motor via the link 184.

Figure 2:
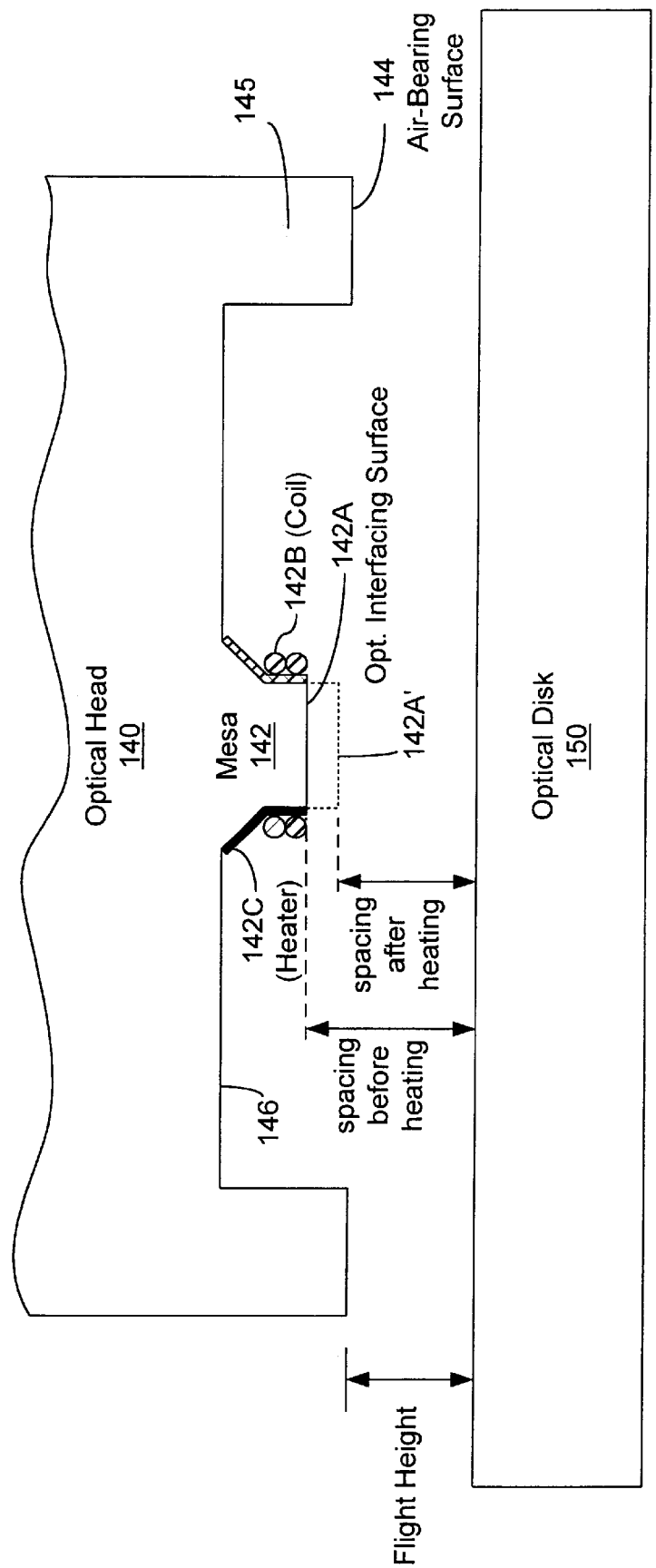
FIG. 2 shows one embodiment of the optical head having a mesa and a heater for heating the mesa.

FIG. 2 schematically shows one embodiment of the optical head 140 that implements a transparent mesa 142 and an electrical coil 142B and a heater 142C. The optical head 140 includes a slider body that has a bottom surface 146 and a protruded portion 145 that supports an air-bearing surface 144. The air-bearing surface 144 allows the optical head 140 to be suspended over the spinning disk 150. The mesa 142 includes a structure protruded from the surface 146. It has an optical interfacing surface 142A that couples the optical energy to and from the optical disk 150. The beam size at the mesa 142 is generally small since the lensing operation of the head 140 focuses the optical beam to the disk 150. Hence, the dimension of the mesa 142 can be configured as small as possible, but sufficiently large to allow transmission of the focused beam without clipping and enough room for beam steering. For example, the mesa 142 may be about 1~100 μm high and the surface 142A may be of about 100 to 2000 μm$^2$ in area.

The coil 142B is used to generate a desired magnetic field for magneto-optic recording. The coil 142B may be eliminated when the disk drive is configured for a phase-change media or other optical recording media that does not require a magnetic field. The heater 142C is formed adjacent to and is thermally coupled to the mesa 142 to provide heating. Thermal expansion of the mesa 142 shifts the surface 142A away from the surface 146, toward the disk 150 and thereby reduces the spacing between the surface 142A and the disk 150. For example, the surface 142 may be at a position 142A' when the mesa 142 is thermally expanded. The preferred position of the surface 142A is approximately at or near the plane defined by the air-bearing surface 144. The heater 142C may be an electric heater that generates heat from an electric current. One example of the electric heater is a conducting film formed on the side surfaces of the mesa 142. Alternatively, the conducting film may be optically transparent and at least partially formed to cover the interfacing surface 142A.

Figure 3:
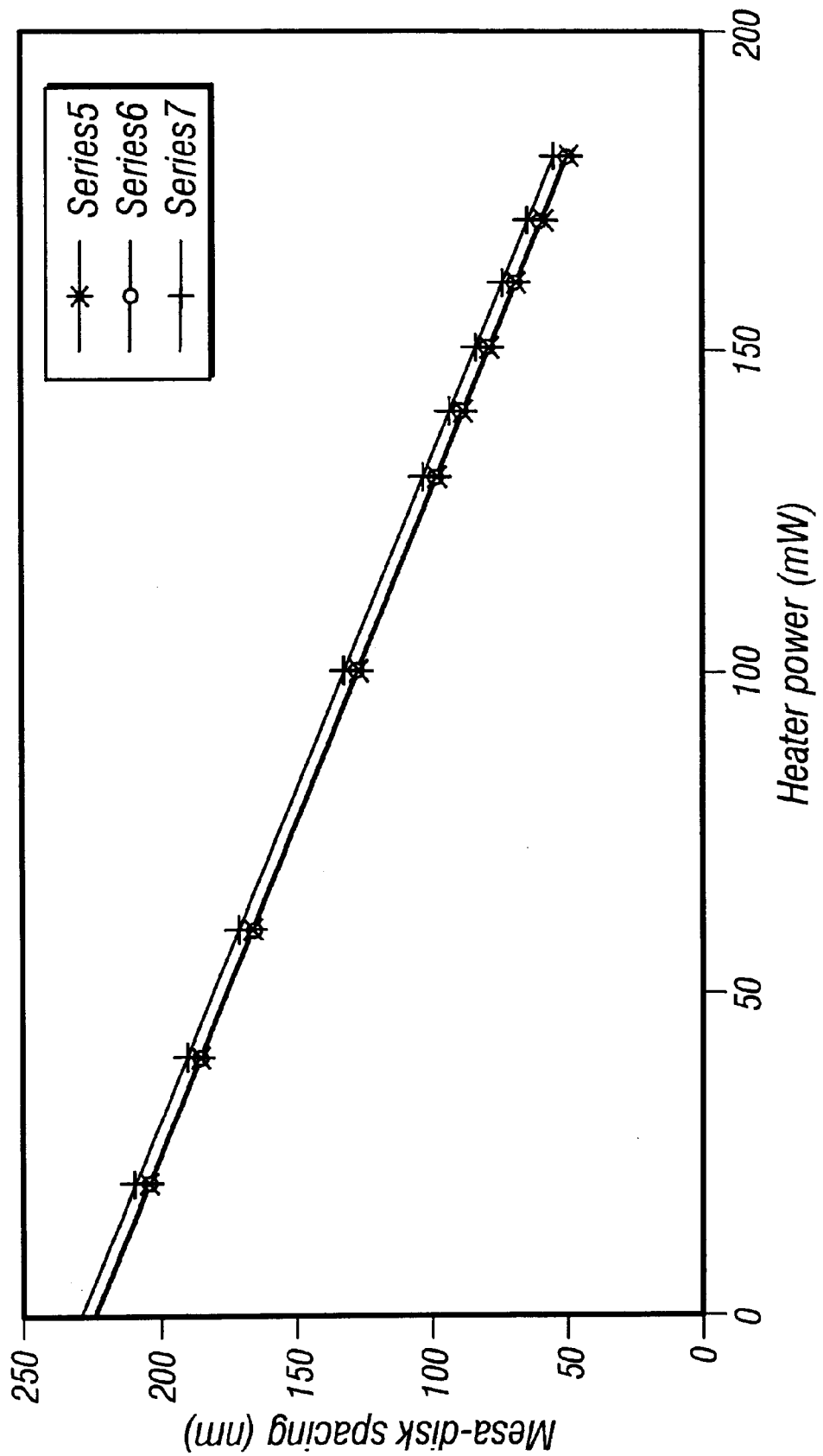
FIG. 3 is a chart showing measured spacing from the interfacing surface on the mesa to the medium surface as a function of the heating power.

FIG. 3 shows the measured spacing from the mesa surface 142A to the disk 150 as a function of the heater power to the mesa 142 in an exemplary head where the head-disk spacing changes about 1 nm per mW. Approximately, the mesa temperature is directly proportional to the electrical power $I^2R$ of the heater 142C, where R is the resistance of the heater 142C. The temperature change of the mesa 142 is approximately a linear function of the heating power.

The control unit 180 is connected by the connection 186 to supply an electric current to the heater 142C. The resistance R of the heater 142C is sufficiently large to generate enough heat so that a desired amount of thermal expansion of the mesa 142 can be produced when the spacing between the mesa surface 142A and the disk 150 is greater than a desired spacing. In general, the heating power from the heater 142C may be adjusted to shift the surface 142A either towards or away from the disk 150. This provides a fine adjustment and a control of the spacing between the head 140 and the disk 150.

The control circuit 180 monitors one or more signals 172 obtained from converting one or more reflected optical signals from the optical head 140 and the disk 150 and determines whether the spacing from the surface 142A to the disk 150 is at a desired value within an acceptable range. The detection module 170 may use an output signal from the data detector, an output from the tracking detector, or interference signals between lands and grooves or pits, or a combination of these signals, to generate the signal 172 that has the information on the actual spacing between the optical head 140 and the disk 150.

In operation, the signal 172 informs the control circuit 180 whether the spacing is different from the desired spacing value. When the spacing is too small, the control circuit 180 decreases the current to the heater 142C so that the amount of protrusion of the mesa 142 is reduced, to shift the interfacing surface 142A away from the disk 150. Conversely, when the spacing between the surface 142A and the disk 150 is too big, the current to the coil 142B may be increased to bring the surface 142A closer to the disk 150. In this way, a closed-loop servo control is formed to maintain the head-disk spacing. The desired head-disk spacing may be a time-varying signal. For example, as certain conditions in the disk drive change over time, the desired spacing may change accordingly. The servo control can be adjusted to maintain the spacing at the new desired spacing.

Figure 4:
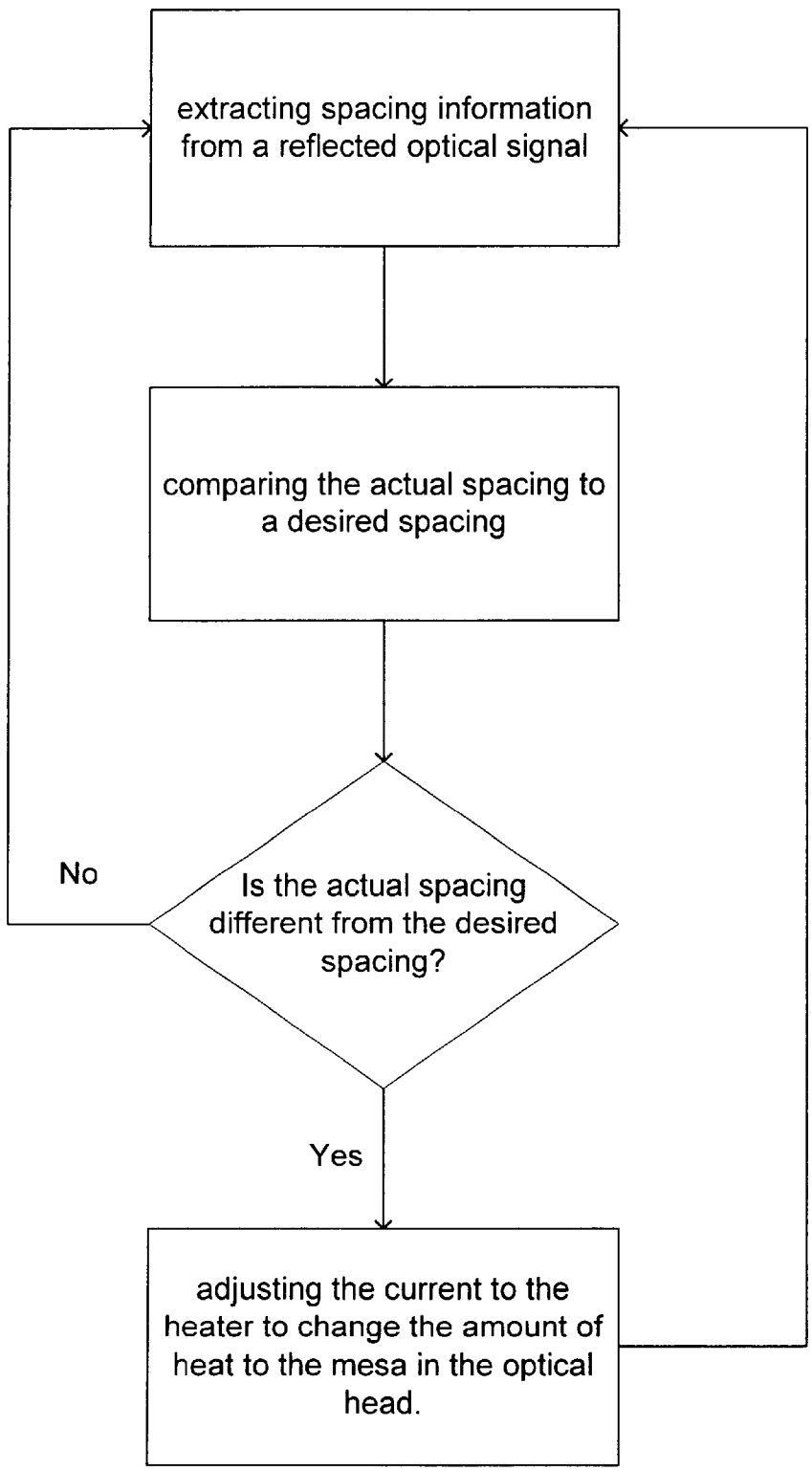
FIG. 4 is a flowchart showing one embodiment of the operation of the control loop for maintaining the head-disk spacing in the disk drive shown in FIG. 1.

A reflected optical signal from the head 140 to the detection module 170 can be used as a spacing-indicating signal and forms the optical part of the loop. The detection module 170 produces the electrical signal 172 from the reflected optical signal to inform the control circuit 180 of the head-disk spacing. The control circuit 180, in turn, compares the actual head-disk spacing to the desired spacing value to produce an error signal. The control circuit 180 further uses the signal 186 to adjust the spacing in order to reduce the amount of error. FIG. 4 represents a flowchart showing one embodiment of the operation of this control loop.

In general, any signal that varies with the spacing between the optical head 140 and the disk 150 may be used, if properly calibrated, to produce the signal 172 to monitor and control the spacing by controlling the amount of current into the heater 142C. For example, an optical signal generated by interference between the reflection from the optical interfacing surface 142A and the reflection from the top surface of the disk 150 has a dependence on the air gap spacing. This signal therefore can be used. The tracking error signal (TES) and the read-only (RO) signal in the reflected beam also vary with the air gap spacing. Further, in a magneto-optic drive in the near-field configuration, the MO signal in the reflected beam changes with the air gap spacing. These signals in the reflected optical beam generally do not change monotonically with the air gap spacing over a wide range of the head-disk spacing. For example, the MO signal may oscillate with the air gap spacing at a spatial period (usually less than one quarter of one wavelength). However, within a small range around a given spacing, e.g., less than the above spatial period, the value of each signal uniquely corresponds to a value of the air gap spacing.

The dependence of a selected optical signal on the air gap spacing can be directly measured or calculated. In order to associate a value of the selected signal to the actual value of the air gap spacing, the measured or calculated data of the signal and the spacing may be calibrated based on a known air gap spacing with a known signal value. One convenient way is to use a calibration of the flying height with reference to the signal value when the head 140 and the disk 150 are in contact (i.e., the air gap spacing is zero).

A number of techniques may be used to determine whether the mesa 142 comes into contact with the disk 150. One technique uses an acoustic emission sensor to measure the acoustic wave generated by the contact between the optical head 140 and the disk 150. An acoustic emission sensor can be formed of a piezoelectrical element which produces an electrical signal under mechanical stress. When such a sensor is placed at or near the optical head 140, the acoustic waves generated by vibration of the optical head 140 from contacting the disk surface can be detected by the sensor. A sensor can be at any location that receives sufficient amount of the acoustic waves generated from the head 140. A sensor may be located on the head 140, on the suspension arm, or on the actuator arm. Since the strength of the acoustic waves decrease with the distance from the point of generation, a sensor is preferably located on or near the head 140.

Figure 5A:
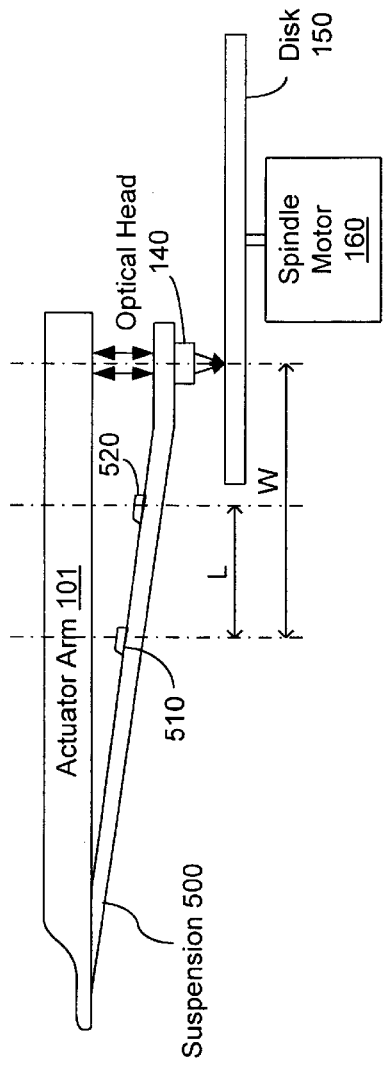
FIG. 5A shows two piezoelectrical sensors forming a resonant detection system on a suspension arm of the disk drive shown in FIG. 1.
Figure 5B:
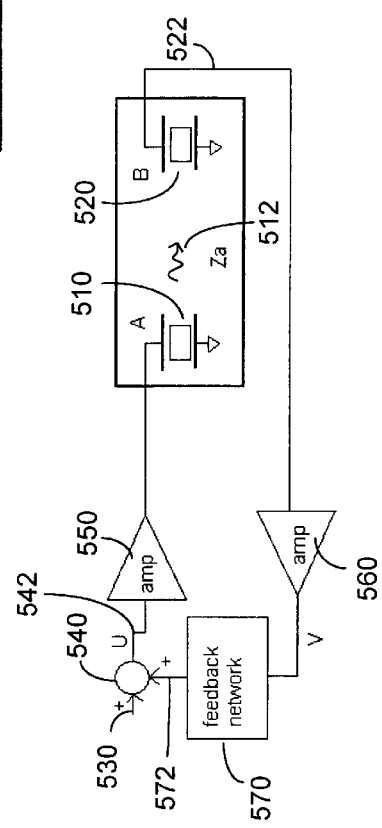
FIG. 5B shows a function block diagram of the piezo-electrical resonant detection system of FIG. 5A.

Two or more acoustic emission sensors may be used in the above acoustic emission sensing. In particular, two piezoelectrical elements may be used to form a feedback sensing loop under a resonance condition to increase the detection sensitivity. FIGS. 5A and 5B show one embodiment of a two-piezo sensing loop in a disk drive.

FIG. 5A shows that two piezoelectrical sensors 510 and 520 are disposed on a suspension arm 501 that engages the optical head 140 to the actuator 101 for the disk drive shown in FIG. 1. The two sensors 510 and 520 are separated by a distance L. The sensor 510 is spaced from the optical head 140 by a distance W. For a given mechanical characteristics of the suspension arm 501, the effective acoustic impedance between the sensor 510 and the optical head is Za.

FIG. 5B shows a resonance feedback sensing loop that connects the sensors 510 and 520. The sensor 510 is configured as a transmitter and the sensor 520 is configured as a receiver. An electrical input signal 530, which may be generated from the control circuit 180 shown in FIG. 1, is used to drive the feedback loop. A signal adder 540 is used to add a feedback signal 572 to the input 530 to generate a driving signal 542. The driving 542 is amplified by an amplifier 550 and then applied to the transmitting sensor 510 to produce an acoustic output 512. The sensor 520 receives this output 512 and the acoustic wave generated from the optical head 140 to produce an electrical signal 522. An amplifier 560 and a feedback network 570 uses the signal 522 to produce the positive feedback signal 572 to the adder 540.

This feedback loop can be designed to have an open loop gain greater than unity to sustain an oscillation at a resonant frequency f0, which is in part determined by the acoustic impedance Za and the contact condition between the optical head 140 and the disk 150. When the optical head 140 is not in contact with the disk 150, the resonant frequency f0 remains substantially constant. However, as the optical head 140 contacts the disk 150, the acoustic impedance Za changes and hence alters the resonant frequency $f_0$ and the phase of the feedback loop. Therefore, monitoring the change in the resonant frequency $f_0$ can determine the contact point between the optical head 140 and the disk 150.

Another technique for detecting the contact uses one of the optical signals coupled between the head 140 and the disk 150. The tracking error signal, for example, may be used. When the optical head 140 normally flies above the disk 150 and the disk drive is performing track following, the tracking error signal is substantially constant with a low level of noise. However, when the mesa 142 comes into contact with the disk 150, vibrations are excited by the friction of that contact to cause signal modulations in the tracking error signal. Therefore, measurements of such signal modulations can be used to determine whether the mesa 142 is in contact with disk 150.

Another indicator of the mesa-disk contact in the TES signal is the signal distortions caused by mass transfer from the disk surface to the mesa 142. A species can be adsorbed to a surface when the temperature of the surface is below a threshold temperature, "desorption temperature." If the surface temperature reaches to or above the desorption temperature, the thermal kinetic energy of the adsorbed species becomes equal to or greater than the binding energy of the surface. The species is hence desorbed from the surface. In the near-field system 100 shown in FIG. 1, light absorption by the recording layer of the disk 150 causes the temperature of the medium surface to rise. Certain species may be desorbed from the medium surface and travel to the interfacing surface 142A of the mesa 142. If the temperature of the interfacing surface 142A is below the adsorption temperature, the particles can become adsorbed and hence mass transfer occurs from the disk surface to the interfacing surface 142A. The adsorbed species can distort any optical signal transmitted to or reflected from the optical medium 150. See, copending U.S. patent application Ser. No. 09/227,778 filed on Jan. 8, 1999.

Hence, the distortion by mass transfer can be used to indicate whether the mesa surface 142A comes into contact with the disk 150. This signal distortion may be obtained from any optical signal coupled from the disk into the optical head 140. Distortion in the TES, for example, can be used for this purpose.

The above signal distortion by mass transfer can be substantially eliminated by contacting the mesa surface 142A to the disk surface. Such a contact can physically remove the adsorbed particles from the mesa surface 142A. Removal of the adsorbed species is desirable because the adsorbed species may be baked to the interfacing surface 142A by the heat from absorption of illuminated light, specially when the beam intensity is high, e.g., during a writing operation. The amount of adsorbed species or other particles on the mesa surface 142A can be controlled at a low level by thermally expanding the mesa 142 to contact the disk 150 from time to time. This cleaning operation by contact may be performed periodically at a desired frequency or on demand when the signal distortion exceeds an acceptable level. See, copending U.S. patent application Ser. No. 09/304,527 filed on May 4, 1999.

Figure 6:
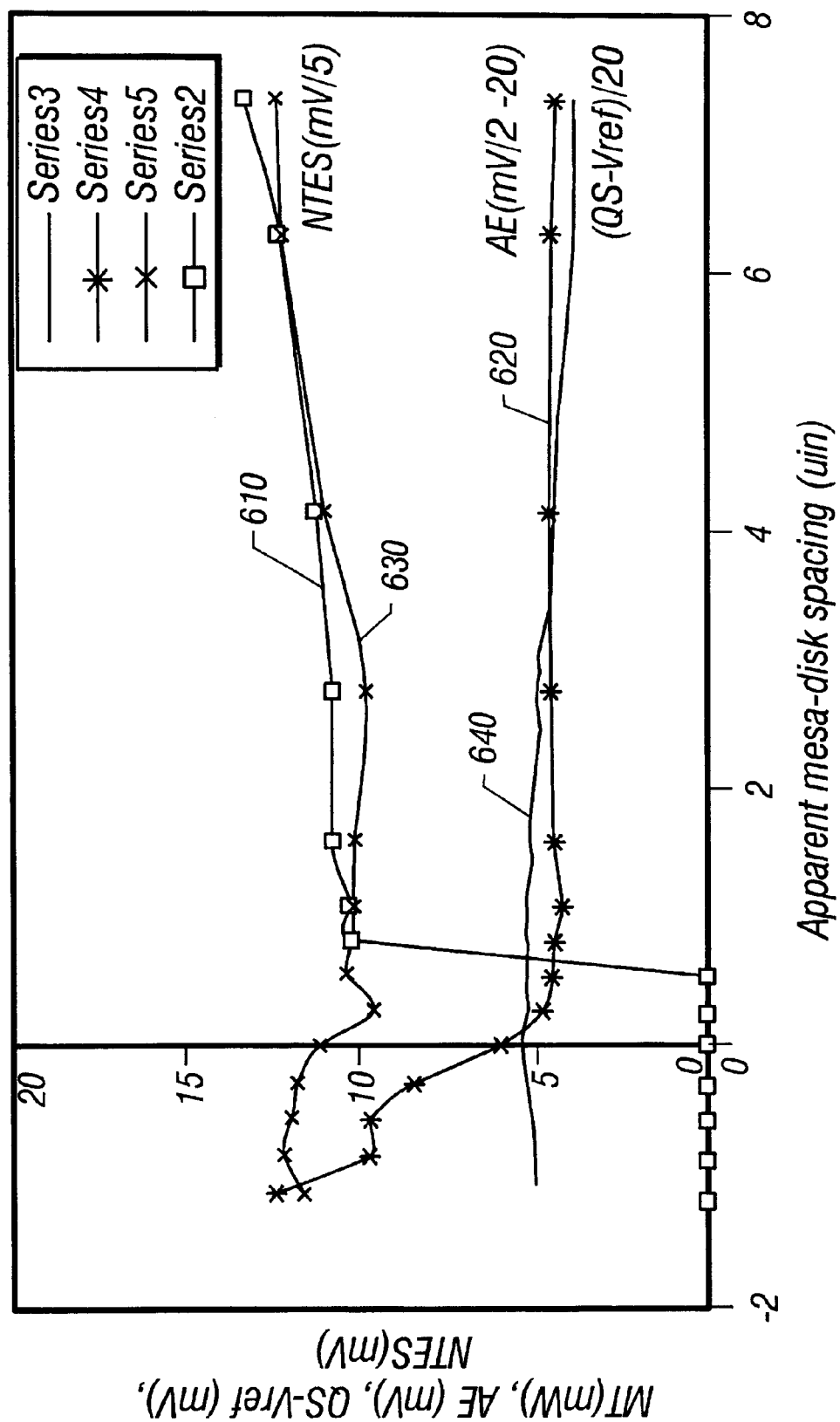
FIG. 6 shows measured optical distortion by mass transfer and acoustic emission signal that indicate a contact between the optical head and the disk.

FIG. 6 shows exemplary measurements of several optical signals as a function of the mesa-disk spacing. Curves 610 and 620 represent measured signal distortion due to mass transfer and the acoustic emission signal, respectively. Both signals 610 and 620 exhibit a significant change when the mesa surface 142A comes into contact with the disk surface and hence can be used to determine the contact point. The measured normalized TES signal 630 and the total sum signal 640 from four quadrants of the servo detector in the detection module 170 are also shown.

During normal operation, such signal distortions caused by the mass transfer may be controlled below a tolerance level by either heating the optical head 140 or by cleaning the optical head 140 by touching the mesa 142 on the disk 150 or other objects in a controlled manner. These mechanisms for controlling the mass transfer may be temporarily disabled when the distortion is used to detect the contact between the head 140 and the disk 150.

FIGS. 7, 8A, 8B, and 8C show another technique for determining the contact between the mesa 142 and the disk 150. Two transparent conductive layers 710 and 720 are formed on the mesa surface 142A and the disk surface, respectively (FIG. 7). The conductive layers 710 and 720 may be formed of indium tin oxide or other transparent, conductive materials. The layer 710 can function both as a heater to control the thermal expansion of the mesa 142 and as a sensor to determine the contact. This method is based on the change of the resistance between two conductive layers 710 and 720 when the mesa 142 comes into contact with the disk 150. This may be achieved by applying a modulated AC current through the conductive layer 710 to measure the leakage current to the conductive layer 720 when they come into contact. A DC current may be applied to the conductive layer 710 to provide heating to the mesa 142 for controlling the air gap.

Figure 8A:
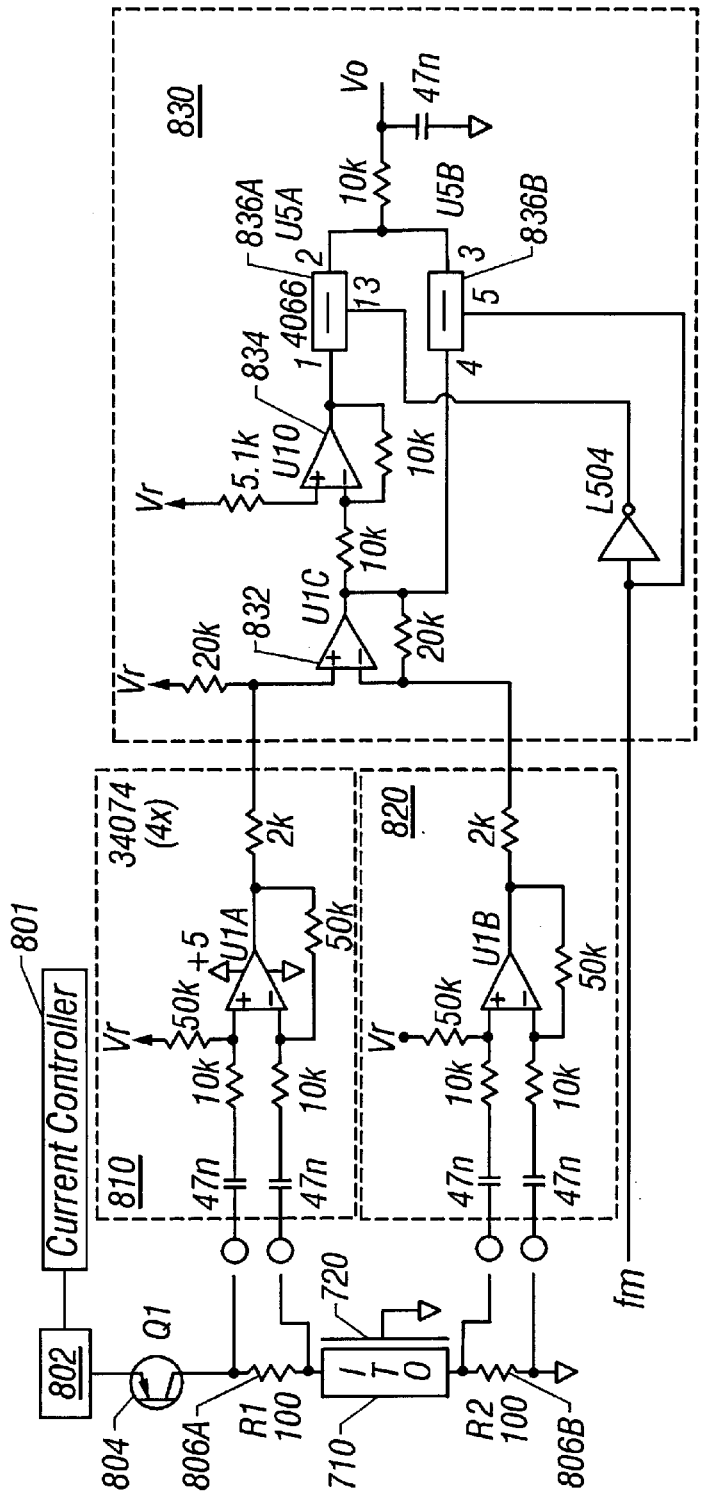
FIGS. 8A, 8B, and 8C show a circuit for contact detection based on measurements of a leakage current.
Figures 8B, 8C:
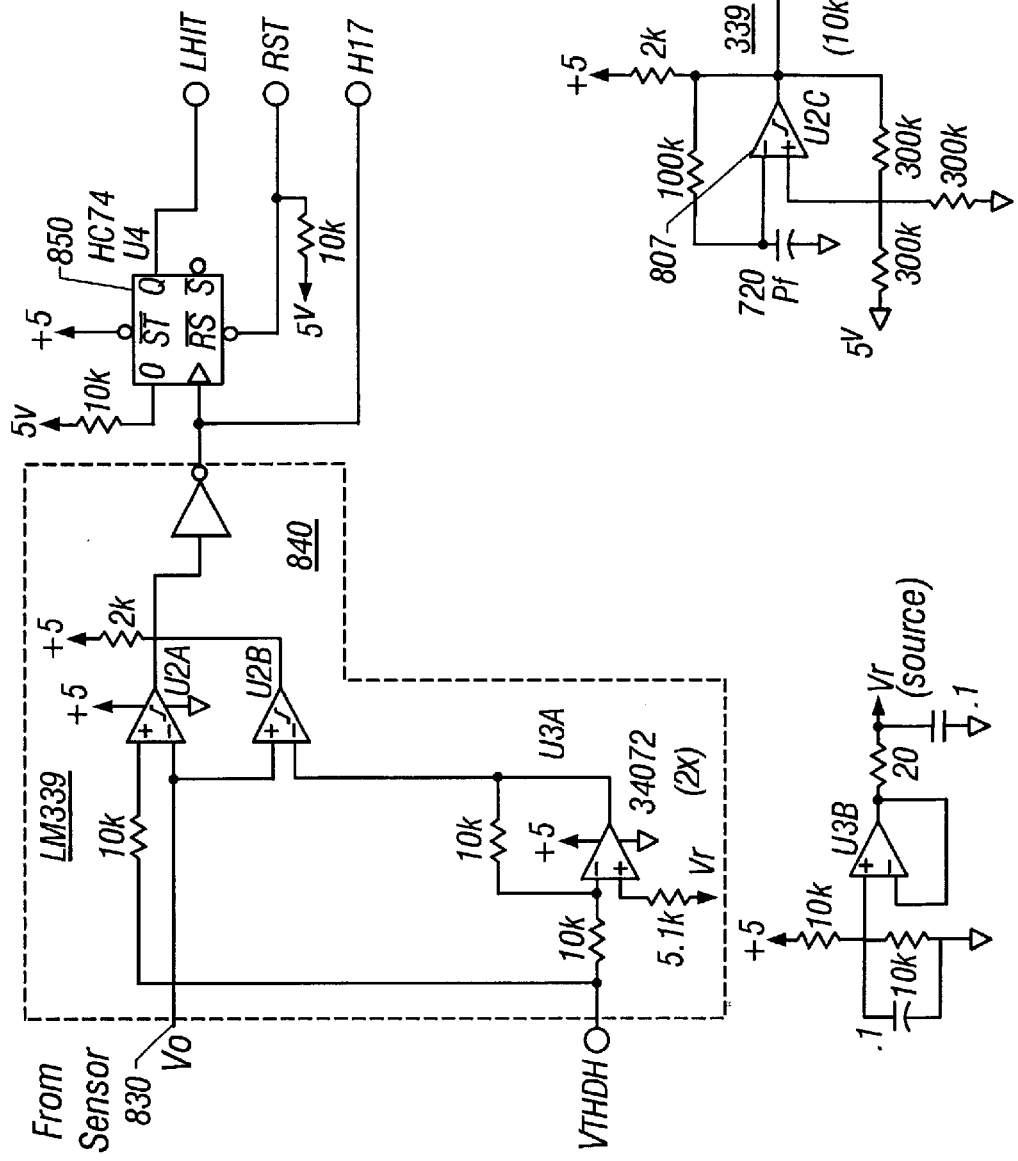

FIGS. 8A, 8B, and 8C show one embodiment of a resistance measuring circuit connected to the conductive layer 710 on the mesa surface 142A. The leakage current from the conductive layer 710 to the grounded conductive layer 720 on the disk 150 is essentially zero when the mesa 142 is separated from the disk 150 and reaches a non-zero level when the mesa 142 contacts the disk 150. The resistance between the two conductive layers 710 and 720 in contact reduces and the leakage current increases as the force pressing the mesa 142 against the disk 150 increases. Hence, the leakage current is not only an indicator of the contact but is also an indicator of a force or pressure at contact.

The conductive layer 720 on the disk 150 may be connected at the inner diameter to a conductive hub which is grounded through the disk-holding spindle. A current source 802 supplies a current having both a DC portion for heating and a modulated AC portion to the conductive layer 710 through a transistor 804 (Q1). A current controller 801 is used to control the current source 802 in two different aspects. First, it has an active negative feedback loop to control the DC current at a level (e.g., about 30 mA) in order to maintain the mesa surface 142A at a desired position. Second, the current controller 802 controls the modulated AC current.

FIG. 8B shows one embodiment of the AC part of the current source 802. A square wave generator 807 produces a square wave at a desired modulation frequency, e.g., at 10 Khz. An analog switch 808 responds to this square wave and modulates a transistor 809 to produce the modulated AC current to transistor 804. The square wave is also used as a modulation reference signal, fm, in a subsequent demodulation stage to detect only the leakage current at the modulation frequency. This scheme increases the detection signal-to-noise ratio and detection sensitivity.

Referring back to FIG. 8A, the conductive layer 710 is connected to the emitter of the transistor 804 through a resistor 806A (R1) and to ground through another identical resistor 806B (R2). Hence, the conductive layer 710 is effectively a three-terminal element with a third terminal being the leakage path to the conductive layer 720 through the contact. When the conductive layers are not in contact, there is no leakage between the layers 710 and 720 so that the currents at the resistors 806A and 806B remain the same. The current in the resistor 806B is less than the current in the resistor 806A, however, when the two layers 710 and 720 are in contact. This is because a portion of the current in the resistor 806A leaks to the conductive layer 720.

Current sensors 810 and 820 are respectively AC coupled to the resistors 806A and 806B to measure their currents. A differential sensor 830 receives the AC currents in the resistors 806A and 806B from the sensors 810 and 820 to produce a DC voltage V0 that is proportional to the leakage current at the modulation frequency. A differential amplifier 832 performs the differentiation. Switches 836A and 836B responds to the modulation reference signal fm to demodulate the output from an amplifier 834 to pick out only the signal at the modulation frequency.

FIG. 8C shows a contact sensor circuit 840 that uses the output DC voltage V0 from the differential sensor 830 to determine whether the layer 710 is in contact with the layer 720. An adjustable threshold Vt is used to make the determination. Vt may have a number of values, including one for contact determination and one or more different values for different degrees of contact, all relative to a reference voltage Vr. The values of Vt for difference degrees of contact may be set so that the contact force is not sufficient to damage the optical head 140 and the disk 150. The control circuit 180 of FIG. 1 may be used to select the values for Vt. The output of the contact sensor 840 may be fed directly to the control circuit 180 or may be latched to a gate 850.

Figure 9:
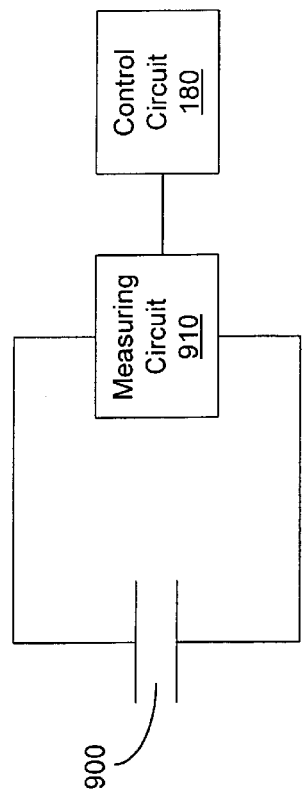
FIG. 9 shows a block diagram of a circuit for spacing detection based on capacitance measurements.

In addition to monitoring a selected optical signal that varies with the air gap, certain non-optical signals may also be generated so that they vary with the air gap. Such non-optical signals hence can be used to monitor and control the spacing between the optical head 140 and the disk 150. FIG. 9 illustrates a use of an electrical signal for measuring the spacing. The principle of this method is based on the capacitance between two conducting plates being a function of their separation. A capacitor 900 can be formed between a conductive layer on the optical head 140 and another conductive layer in the optical disk 150. The conductive layer on the optical head 140 may be the transparent conductive layer 710 as shown in FIG. 7, or a conductive layer formed on another surface which can be, e.g., the surface 146 at the base of the mesa 142 or the air bearing surface 144. The conductive layer on the optical disk 150 may be the transparent conductive layer 720 formed on the top of the disk 150 or another conductive layer beneath the top surface of the disk 150 (e.g., a metallic reflector layer upon which at least one transparent dielectric layer is formed). Such a conductive layer may be opaque if it is not in the optical path of the optical signals. In the example of FIG. 9, the capacitor 900 is formed between the mesa 142 and the optical disk 150 by the transparent conductive layers 710 and 720 on the mesa surface 142A and the disk surface, respectively (FIG. 7). A measuring circuit 910 is electrically coupled to the conductive layers 710 and 720 to measure the capacitance and send the measured capacitance values to the control circuit 180.

The measuring circuit 910 may include an LC oscillator that produces an output signal at an oscillating frequency f. This frequency f is a function of the capacitor C and the conductance L of the LC oscillator. The circuit 740 compares the frequency f to a reference frequency from a crystal oscillator or an external frequency reference by, e.g., using a phase-locked loop. For a constant L, a change in the frequency difference with the reference indicates a change in the spacing between the conductive layers 710 and 720. The frequency difference can be calibrated to measure the actual spacing. This may be done by using the relation of the flying height as a function of the spindle speed, or an optical signal that varies with the air gap. A known relation between the spacing and the capacitance may also used for calibration.

The above techniques for controlling the spacing between the optical head 140 and the disk 150 may be used to adjust the spacing at a desired value when the disk drive is assembled, to check and adjust the mesa-disk spacing periodically or continuously during normal operation, or whenever the operating condition of the disk drive is changed. In addition, these techniques can be used to compensate variations in the dimension of the different optical heads so that the spacing between the interfacing surface of each optical head and the optical disk can be individually adjusted to optimize the performance. Moreover, certain otherwise defectively manufactured optical heads may be usable by thermally extending the mesa and hence the yield of fabrication can be improved.

Although a few embodiments have been described, various modifications and enhancements may be possible without departing from the following claims.

What is claimed is:

1. An optical disk drive, comprising:
   an optical head having an optically transparent interfacing surface that couples radiation to and from an optical storage disk;
   a detection unit to receive and detect a signal from said optical head that includes information indicating a spacing between said interfacing surface and the disk;
   an electrical heater disposed in said optical head to receive an electric current to supply heat to thermally shift said interfacing surface relative to the disk along a direction substantially perpendicular to the disk to control said spacing; and
   a control circuit coupled to receive said spacing information from said detection unit and to control said electric current to maintain said spacing at a desired value.

2. A disk drive as in claim 1, wherein said optical head comprises a transparent mesa structure having a mesa surface to effect said interfacing surface, and wherein said electrical heater is thermally coupled to said mesa structure.

3. A disk drive as in claim 2, wherein said electrical heater includes a conducting film.

4. A disk drive as in claim 1, wherein said detection unit includes an optical detector that receives and processes a reflected optical signal from said optical head that has a dependence on said spacing.

5. A disk drive as in claim 4, wherein said reflected optical signal includes a magneto-optic signal or a phase change signal.

6. A disk drive as in claim 4, wherein said reflected optical signal includes a read-only signal.

7. A disk drive as in claim 4, wherein said reflected optical signal includes an optical distortion caused by mass transfer from the disk to said interfacing surface to determine whether said optical head is in contact with the disk.

8. A disk drive as in claim 1, wherein said detection unit includes an acoustic emission detector that receives an acoustic signal from said optical head and determines whether said optical head is in contact with the disk based on a change in said acoustic signal.

9. A disk drive as in claim 1, further comprising a suspension arm engaged to said optical head, and wherein said detection unit includes:
   first and second piezoelectric sensors disposed on said suspension arm and spaced from each other, said second piezoelectric sensor operable to respond to acoustic signals from said first piezoelectric sensor and said optical head to produce an output electrical signal;
   a feedback loop having a signal adder to receive an input signal that drives said first piezoelectric sensor, a feedback network coupled to receive said output electrical signal and to produce a feedback signal to said signal adder, wherein said feedback loop is operable to oscillate at a resonance frequency whose variation indicates whether said optical head is in contact with the disk.

10. A disk drive as in claim 1, further comprising a first transparent conductive layer formed over said interfacing surface of said optical head and a second conductive layer formed over the disk.

11. A disk drive as in claim 10, wherein said detection unit includes a leakage sensing circuit coupled to measure a leakage current between said first and second conductive layers in order to determine a contact therebetween.

12. A disk drive as in claim 11, wherein said leakage sensing circuit is coupled to said first conductive layer.

13. A disk drive as in claim 11, wherein said leakage sensing circuit includes a current source to provide a modulated current at a modulation frequency and a detection circuit to select and detect only a component in said leakage current that oscillates at said modulation frequency.

14. A disk drive as in claim 10, wherein said detection unit includes a capacitance measuring circuit coupled to said first and second transparent conductive layers and to measure a capacitance of a capacitor formed by said first and second conductive layers in order to determine said spacing.

15. A disk drive as in claim 1, further comprising a first conductive layer in said optical head and a second conductive layer in the disk, and wherein said detection unit includes a capacitance measuring circuit coupled to said first and second conductive layers and to measure a capacitance of a capacitor formed by said first and second conductive layers in order to determine said spacing.

16. A disk drive as in claim 15, wherein said optical head includes a surface different from said interfacing surface and said first conductive layer is formed over said surface.

17. A disk drive as in claim 15, wherein said first conductive layer is transparent and is formed over said interfacing surface.

18. A disk drive as in claim 15, wherein said second conductive layer is located within the disk.

19. A method for operating an optical disk drive, comprising:

positioning an optical head over a disk to suspend the head by an air-bearing action, wherein the optical head includes an optical interfacing surface to couple optical signals;

measuring a spacing-indicating signal from the optical head that indicates a spacing between said interfacing surface and the disk; and supplying heat to the optical head to change a position of the interfacing surface by thermal expansion so as to maintain the spacing between the interfacing surface and the disk at a desired value by adjusting the heat according to the spacing-indicating signal.

20. A method as in claim 19, wherein measuring the spacing-indicating signal comprises:

detecting a reflected optical signal from the optical head to determine the actual spacing between the interfacing surface and the disk;

determining a difference between the actual spacing and the desired spacing; and further comprising:

adjusting an amount of heat to the optical head to reduce the difference.

21. A method as in claim 20, wherein the spacing-indicating signal includes an acoustic emission signal that indicates a strength of an acoustic wave generated by a contact between the optical head and the disk.

22. A method as in claim 20, wherein the spacing-indicating signal includes an optical distortion signal caused by mass transfer from the disk to the interfacing surface of the optical head to determine whether the optical head is in contact with the disk.

23. A method as in claim 22, wherein the distortion signal is obtained from a tracking error signal.

24. A method as in claim 19, further comprising providing first and second conductive layers on the optical head and the disk, respectively, to form a capacitor therebetween, and wherein measuring the spacing-indicating signal comprises detecting a capacitance between the first and second conductive layers to determine the actual spacing between the interfacing surface and the disk.

25. A method as in claim 24, wherein the first conductive layer is formed over the interfacing surface.

26. A method as in claim 24, wherein the optical head includes a surface different from the interfacing surface and the first conductive layer is formed over the surface.

27. A method as in claim 24, wherein the second conductive layer is formed within the disk.

28. A method as in claim 19, further comprising providing first and second conductive layers on the interfacing optical surface and the disk, respectively, and supplying a current to one of the first and second conductive layers, and wherein measuring the spacing-indicating signal comprises detecting a leakage current between the first and second conductive layers to determine whether the interfacing surface contacts the disk.

29. A method as in claim 19, wherein the desired value for the spacing is a time-varying signal.

30. A method for operating an optical disk drive, comprising:

positioning an optical head over a disk to suspend the head by an air-bearing action, wherein the optical head includes an optical interfacing surface to couple optical signals;

measuring a spacing-indicating signal from the optical head that has a dependence on a spacing between the interfacing surface and the disk;

determining an actual spacing between the interfacing surface and the disk according to the spacing-indicating signal; and supplying heat to the optical head to change a position of the interfacing surface by thermal expansion so as to reduce a difference between the actual spacing and a desired spacing.

31. A method as in claim 30, wherein the spacing-indicating signal includes an optical signal.

32. A method as in claim 31, wherein the optical signal includes a read-only signal.

33. A method as in claim 31, wherein the optical signal includes a magneto-optic signal or a phase-change signal.

34. A method as in claim 31, further comprising calibrating the spacing dependence of the optical signal with respect to a known reference spacing between the interfacing surface and the disk.

35. A method as in claim 34, wherein the calibrating includes measuring an acoustic wave to determine whether the optical head is in contact with the disk.

36. A method as in claim 34, wherein the calibrating includes measuring an optical distortion caused by mass transfer from the disk to the interfacing surface and the distortion becomes substantially eliminated when the interfacing surface comes into contact with the disk.

37. A method as in claim 36, wherein the optical distortion is measured from an tracking error signal.

38. A method as in claim 34, wherein the calibrating includes measuring a leakage current between a conductive layer formed over the optical interfacing surface and a conductive layer over the disk.

39. A method as in claim 38, wherein the conductive layer in the disk is a reflective layer located under at least one transparent layer.

40. A method as in claim 30, wherein the spacing-indicating signal is an electrical signal.

41. A method as in claim 40, wherein the electrical signal indicates a capacitance of a capacitor that is effected between a conductive layer in the optical head and a conductive layer in the disk.

* * * * *